March 19, 1968     A. J. FLOCCHINI     3,373,761

AUTOMATIC CONTROL MECHANISM FOR MILKING MACHINES

Filed Oct. 24, 1965

INVENTOR
*Andrew J. Flocchini.*

United States Patent Office 3,373,761
Patented Mar. 19, 1968

3,373,761
AUTOMATIC CONTROL MECHANISM FOR MILKING MACHINES
Andrew J. Flocchini, 7078 Lakeville Highway, Petaluma, Calif. 94952
Filed Oct. 24, 1965, Ser. No. 504,871
3 Claims. (Cl. 137—205)

ABSTRACT OF THE DISCLOSURE

Apparatus for controlling the milking of a dairy animal in which a time-delay relay, energized by a milk-responsive probe, releases a spring-loaded arm to cut off the vacuum to the animal when the milk flow ceases for more than a preselected interval.

---

This invention relates to dairying, and more particularly, to a mechanism adapted to the operation of milking machines.

While milking machines date back at least in theory, as far as 1819, that part of the machine which automatically shuts off the milker is relatively recent in development. Even so, a number of different devices have been suggested, and in some cases tried out. None has been developed, until the present invention, that is entirely satisfactory. For one thing, at least one or more attempts have been made to operate the control mechanism by vacuum. This involves the use of complicated and questionable mechanisms that present problems in keeping the unit or units clean and sanitary.

It is therefore the principal object of this invention to provide an automatic control mechanism for milking machines which I personally call an automatic tending milk claw that is more efficient than anything now on the market, by reason of it being operated by electricity as will hereinafter be described.

Another object of this invention is to provide an automatic control mechanism for milking machines that contains a minimum number of accessible parts requiring a minimum amount of attention.

Another object of this invention is to provide an automatic control mechanism for milking machines that is both light in weight and compact in size.

Another object of this invention is to provide an automatic control mechanism for milking machines that is connected to a number of milking machine tubes which are all operated by one man and each of which tubes is connected to a teat or quarter of a dairy animal.

Still another object of this invention is to provide an automatic control mechanism for milking machines that will become activated when the flow of milk from a cow stops as will be understood by those experienced in the art of mechanically milking a cow.

Other objects and advantages will appear in the following specification and the novel features of the invention will be particularly pointed out in the appended claims.

Figure 1:
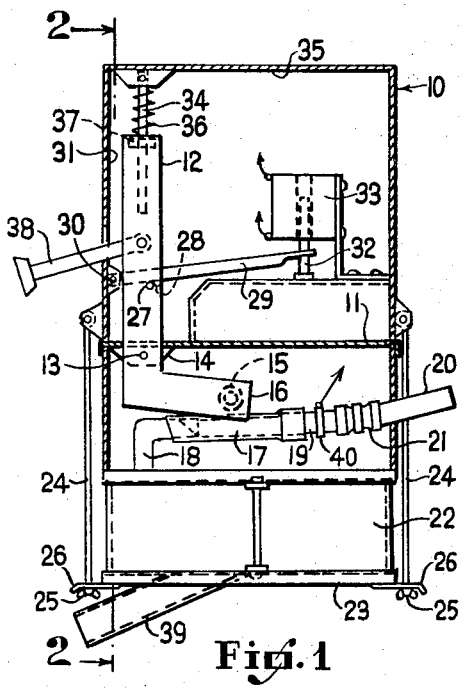
FIGURE 1 is a sectional view of this invention taken along line 1—1 of FIGURE 2.

Looking now at the drawing, and particularly at FIGURE 1, it will be seen that this invention embodies a rectangular cabinet 10 in which is mounted a horizontally disposed shelf 11. The just mentioned cabinet 10 which is made of steel or the like, contains any desired number of the automatic control mechanisms, there being one mechanism for each tube of the milking machine. Each mechanism embodies an L-shaped arm 12 that is swingably secured to the underside of the shelf 11 by means of the pin 13 passing through both sides of the arm 12 and the flange 14 as clearly shown in FIGURES 1 and 3 of the drawing. A roller 15 is mounted in the lower end 16 of the arm 12. The roller is located between the two side plates that go to make up the aforesaid arm 12. The roller rests on the upper surface of the flexible tube 17 that has one end connected to the upper end of the inverted L-shaped tube 18 while the other end is connected to the tubular member 19 that in turn is connected to one end of the tubing 20 by means of the insulating tube 21. The outer end of the tubing 21 being secured to one end of the milk tube of the milking machine which is not shown in any of the views of the drawing since the milking machine itself is not an actual part of this invention.

The vertically disposed portion of the aforesaid inverted L-shaped tube 18 terminates in the top of the plastic chamber or bowl 22 which rests on top of the horizontally disposed member 23 that is secured to the cabinet 10 by means of two vertically disposed rods 24, each one of which has a wing nut 25 screwed on the lowermost end thereof after it has passed through the horizontally disposed lug 26 that has one end secured to the underside of member 23. The upper end of each rod 24 is hingedly secured to the outside of cabinet 10. A pulsating vacuum supply (not separately shown) wellknown in the milking machine art is connected into the chamber 22.

A rod 27 is mounted on the aforesaid arm 12 in order that it may engage the lug 28 that is secured to the underside of the arm 29 which has one end hinged at 30 to the inside of wall 31 of the aforesaid cabinet 10, while the other end of the arm 29 is forked in order that it may straddle the vertically disposed rod 32 of the solenoid 33 that is mounted in the cabinet 10 as shown in the drawing. The rod 34 is swingably hinged to the underside of the top 35 of the above mentioned cabinet 10. The rod 34 extends downward through the coil spring 36 that has its lower end resting on top of the adjustable collar 37 which is mounted on the aforesaid rod 34 as well as being between the two sides of the uppermost end of the arm 12 of this invention. The pivots are disposed so that there is spring pressure on the arm to cause it to move clockwise when in the latched position shown in FIG. 1. The hand operated lever 38 projects outward from the cabinet of this invention where it, the lever, is swingably secured by one end to the arm 12 in order that the mechanism can be set or cocked at the time milking of a cow is started. A milk outlet pipe or tube 39 extends angularly from the bottom of the aforesaid plastic chamber or bowl 22 to the milk can in which the milk is stored and/or distributed to the users.

The actual operation of this invention, whose construction I have now described in detail, is quite simple.

Figure 3:
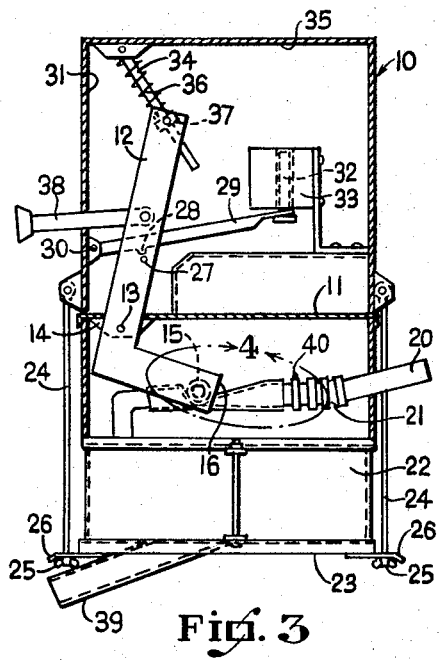
FIGURE 3 is a sectional view of this invention similar to that shown in FIGURE 1 but with the movable mechanism in a different position.
Figure 5:
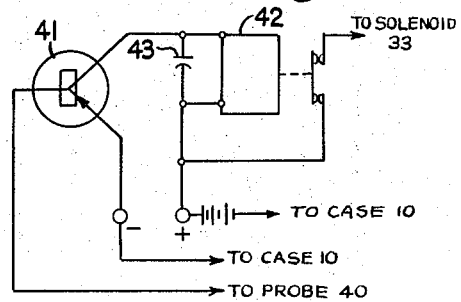
FIGURE 5 is a wiring diagram of the electrical part of this invention.
Figure 4:
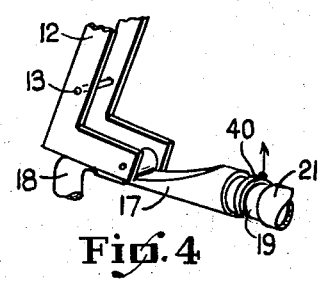
FIGURE 4 is a pictorial view of that part of this invention that is enclosed within the arrowed ellipse as indicated by the numeral 4 on FIGURE 3.

The milk tube of the milking machine is connected to the tubing 20 and the mechanism set in the position shown in FIGURE 1 of the drawing by the outward pulling of the lever 38. Arm 29 drops downward by its own weight and the weight of the solenoid rod 32 to latch lug 28 to rod 27. The milk from the cow flows down through the tube 20 from the milking machine and on through the insulating tube 21, through the electrode or probe 40 that is adapted to the aforesaid tubular member 19 and which is indicated in FIGURES 1 and 3 of the drawing. The aforesaid electrode or probe of any conventional design is connected by an electric wire to the transistor 41 that is shown only in FIGURE 5 of the drawing. The transistor is also connected to both the metal cabinet 10 and the relay 42. The transistor amplifies the current flow from the probe 40 in order to keep relay 42 open. The relay 42 energizes the aforesaid solenoid 33 when the contacts of relay 42 close. The flow of milk through probe 40 is not continuous but is in pulses as in hand milking. Condenser 43 keeps relay 42 energized between pulses. The condenser 43 will hold the aforesaid relay 42 open, thus keeping the solenoid 33 deenergized until the milk stops flowing for a long period of time through the aforesaid tube 20. This is longer than the normal interval between pulses in the flow of the milk. After this period, the energized solenoid will lift the lever 29, thus causing the spring-loaded arm 12 to snap into the position shown in FIGURE 3 of the drawing, thereby shutting off the vacuum in the flexible tube 17 and stopping the milking of that quarter of the animal being milked.

Figure 2:
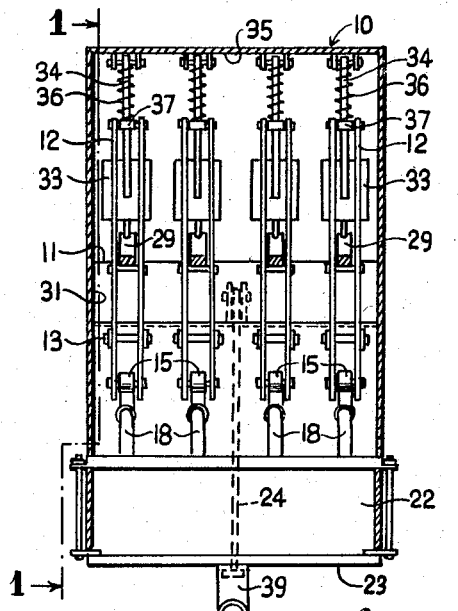
FIGURE 2 is a sectional view of this invention taken along line 2—2 of FIGURE 1.

It will be seen from examination of FIGURE 2 of the drawing that there are four of the above described automatic control mechanisms contained within one case 10, each one of the mechanisms connects to one of the milk tubes attached to a cow for milking.

While I have shown and described certain embodiments of my invention, it is to be understood that it is capable of modifications. Changes, therefore, in the construction and arrangement may be made without departing from the spirit and scope of the invention as disclosed in the appended claims.

What I now claim as new and desire to secure by Letters Patent is:

1. Apparatus for controlling the milking of a dairy animal comprising: a pulsating vacuum supply, a compressible tube for connecting the vacuum supply to the animal and for carrying milk from the animal, an L-shaped member pivotally mounted adjacent said flexible tube, said member having a long leg and a short leg, a roller mounted on said short leg and disposed to contact said tube, a spring mounted at the end of said long leg for biasing said roller into contact with said tube and compressing the tube to shut off the vacuum supply, latch means connected with said member for holding the member away from contact with the tube, a solenoid-operated latch release to permit the member to compress the tube, a time delay relay, and a probe connected into the flexible tube and to the relay for sensing the pulsating flow of milk from the animal and energizing the relay, said time delay relay adapted to actuate the solenoid after the relay has been deenergized for a preselected elapsed time interval, said interval being greater than the normal intervals between pulses of milk.

2. The apparatus of claim 1 and wherein said L-shaped member comprises a pair of L-shaped pieces connected together, said roller mounted between said pieces so that the flexible tube is received between the pieces when the roller contacts the tube, and an actuation arm connected to the L-shaped member for manually holding the member away from contact with the tube until the flow of milk is established.

3. The apparatus of claim 2 and wherein the spring is a compression spring and is mounted so that its longitudinal axis is approximately in line with the pivotal mounting of the member so that the force tending to pivot the member is at a minimum when the member is held away from the flexible tube and the force increases as the member pivots to compress the flexible tube.

References Cited

UNITED STATES PATENTS

| | | | |
|---|---|---|---|
| 952,978 | 3/1910 | Cramp | 119—14.08 |
| 2,696,194 | 12/1954 | Perkins | 119—14.08 |
| 3,155,116 | 12/1963 | Schilling | 119—14.08 |

FOREIGN PATENTS

| | | |
|---|---|---|
| 650,199 | 2/1951 | Great Britain. |

ALAN COHAN, *Primary Examiner.*